(12) United States Patent
Ayyar et al.

(10) Patent No.: US 7,433,985 B2
(45) Date of Patent: Oct. 7, 2008

(54) CONDITIONAL AND VECTORED SYSTEM MANAGEMENT INTERRUPTS

(75) Inventors: Mani Ayyar, Cupertino, CA (US); Ioannis Schoinas, Portland, OR (US); Rama R. Menon, Portland, OR (US); Aniruddha Vaidya, Mountain View, CA (US); Akhilesh Kumar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 11/320,923

(22) Filed: Dec. 28, 2005

(65) Prior Publication Data

US 2007/0150632 A1 Jun. 28, 2007

(51) Int. Cl.
*G06F 13/24* (2006.01)
*G06F 13/26* (2006.01)
*G06F 13/32* (2006.01)

(52) U.S. Cl. .................. 710/260; 710/261; 710/264; 710/267; 710/269

(58) Field of Classification Search ......... 710/260–261, 710/267, 264, 269; 702/187; 711/2; 712/31; 713/1, 320; 714/5
See application file for complete search history.

(56) References Cited

U.S. PATENT DOCUMENTS

| | | | | |
|---|---|---|---|---|
| 6,158,000 | A * | 12/2000 | Collins | 713/1 |
| 6,272,618 | B1 * | 8/2001 | Tyner et al. | 712/31 |
| 6,711,642 | B2 * | 3/2004 | Huang | 710/260 |
| 6,775,728 | B2 * | 8/2004 | Zimmer et al. | 710/260 |
| 6,820,040 | B2 * | 11/2004 | Bouchet | 702/187 |
| 6,968,410 | B2 * | 11/2005 | Bennett et al. | 710/260 |
| 7,200,701 | B2 * | 4/2007 | Stultz | 710/267 |
| 2003/0126349 | A1 * | 7/2003 | Nalawadi et al. | 711/2 |
| 2004/0107374 | A1 * | 6/2004 | Cooper et al. | 713/320 |
| 2006/0075286 | A1 * | 4/2006 | Hodge et al. | 714/5 |

OTHER PUBLICATIONS

IBM-TDB, "Extension to 68k Manual Vector Range," Oct. 1, 1989, IBM, vol. 32, Issue 5B, pp. 452.*

* cited by examiner

*Primary Examiner*—Mark Rinehart
*Assistant Examiner*—Thomas J. Cleary
(74) *Attorney, Agent, or Firm*—Blakely, Sokoloff, Taylor & Zafman LLP

(57) ABSTRACT

An embodiment of the present invention is a technique to process system management interrupt. A system management interrupt (SMI) is received. The SMI is associated with a system management mode (SMM). A conditional SMI inter-processor interrupt (IPI) message is broadcast to at least a processor. The SMI is processed without waiting for the at least processor to check into the SMM. A clear pending SMI is broadcast to the processors at end of SMI processing to clear a pending SMI condition.

30 Claims, 8 Drawing Sheets

CONDITIONAL AND VECTORED SYSTEM MANAGEMENT INTERRUPTS

BACKGROUND

1. Field of the Invention

Embodiments of the invention relate to the field of computer system management, and more specifically, to system management interrupts.

2. Description of Related Art

On many computer platforms, system management interrupt (SMI) is a global event that causes all the logical processors in the system to be brought into the system management mode (SMM). Usually, the SMI is a front-side bus (FSB) pin that is asserted to signal the SMI event. In a typical scenario, one of the logical processors processes SMI while other processors wait within the SMM code for an exit signal from this processor. Such a rendezvous logic ensures that while the SMI is being handled, no other processors may make conflicting accesses to the platform resources being manipulated by the SMM code.

While the current SMI design may offer a solution for avoiding resource conflicts, it suffers a number of disadvantages. First, it may waste processing time. In many SMI instances, other processors are forced to enter the SMM and stay idle. Therefore, considerable time quantum is wasted in synchronizing actions of multiple processors in the system. Second, future interconnects may not have a physical SMI pin. Accordingly, transitions of multiple processors into the SMM may not occur simultaneously. Third, there may be significant overheads associated with polling multiple status registers spread across several components in the system. Fourth, SMI handling may be inefficient in event handler invocation or due to the sequential execution of the SMI code in a multiprocessing environment, especially when multiple sources assert the SMI concurrently.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1A:
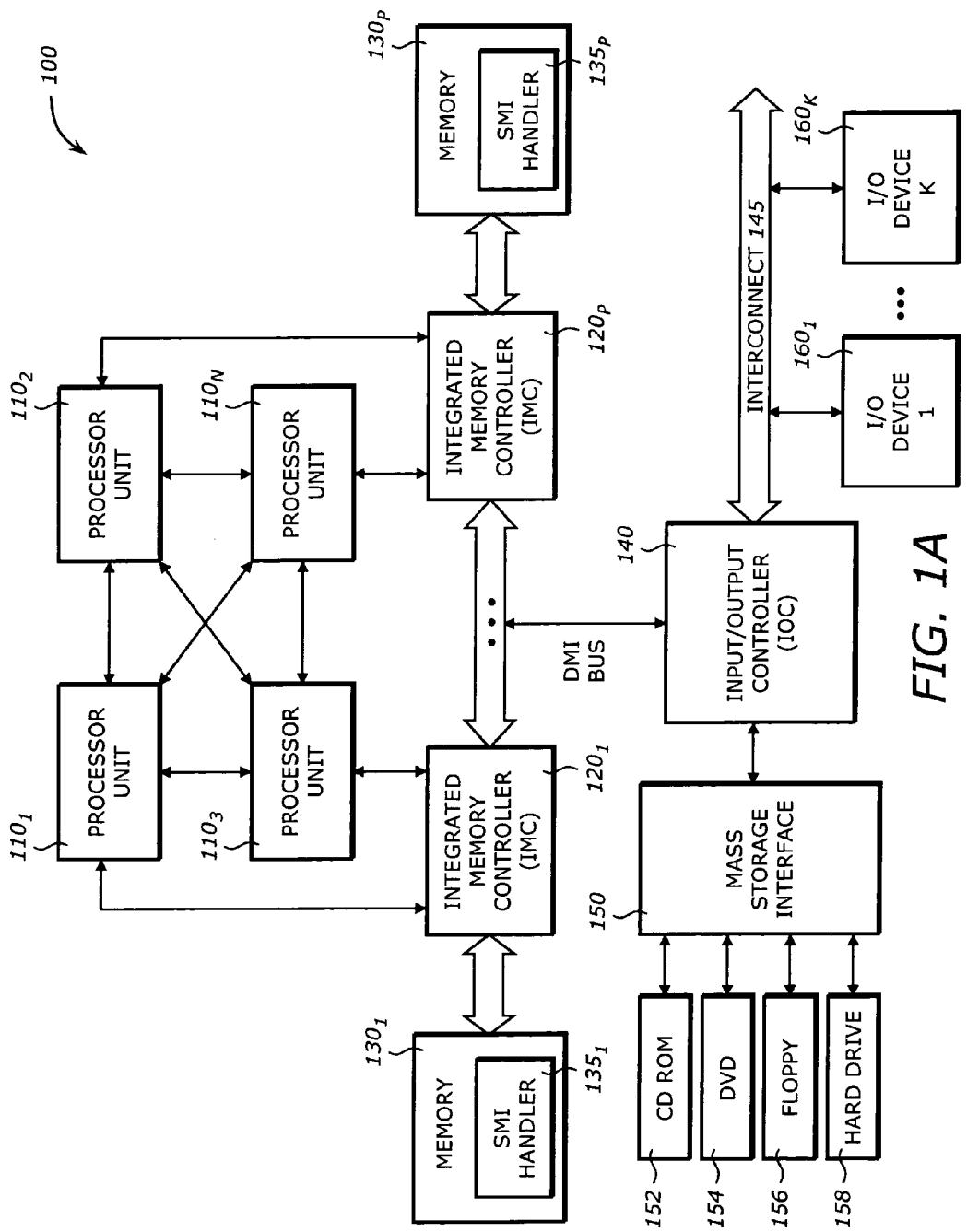
FIG. 1A is a diagram illustrating a link-based system in which one embodiment of the invention may be practiced.

An embodiment of the present invention is a technique to process system management interrupts. A system management interrupt (SMI) is received. The SMI is associated with a system management mode (SMM). A conditional SMI inter-processor interrupt (IPI) message is broadcast to at least a processor. The SMI is processed without waiting for the at least processor to check into the SMM. A clear pending SMI is broadcast to the processors at end of SMI processing to clear a pending SMI condition at the receiving processors. In another embodiment, a SMI IPI message for an SMI event is received. A vector identifier associated with the SMI IPI message is obtained. A vector table is indexed using the vector identifier to obtain a pointer to a handler corresponding to the SMI event. The handler is processed to service the SMI event.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to process SMIs in a multiprocessor system. The technique optimizes the handling of the SMIs by bringing as few processors into the SMM as possible. When a processor, referred to as a SMI monarch processor, in the system receives a directed vectored SMI, it may set a flag, called a SMI In-Progress (SMI_In_Prog) flag, to indicate that the monarch processor is executing in SMM. Then, the monarch processor sends a conditional SMI IPI message to all other processors in the system. It then proceeds with SMI processing without requiring the other processors to check into the SMM layer code. Typically, a processor executes in a privilege level as configured by the operating system (OS). There may be 4 privilege levels, 0, 1, 2, and 3, with 0 corresponding to the highest privilege level and 3 corresponding to the lowest privilege level. Processors executing in the privilege levels 0, 1, or 2, referred to as application processors (APs), recognizes the conditional SMI IPI message at the end of the current instruction cycle and enters the SMM. These APs then check the SMI_In_Prog flag to see if the monarch is still executing in SMM. If the SMI_In_Prog flag is still set, these APs remain in the SMM. Otherwise, they may exit the SMM as described below. Processors executing in the privilege level 3, referred to as deferred APs, continue to do useful work while latching a pending SMI condition. If during SMI processing, a deferred AP processor responds to a task requiring switching to a higher privilege level, it transitions to SMM first, thus avoiding potential conflict with the SMI monarch usage of platform resources. When SMI processing is completed, the SMI monarch clears the SMI_In_Prog flag and broadcasts a clear pending SMI IPI message to all other processors to clear any pending SMIs. The APs that entered the SMM may now exit the SMM after recognizing that the SMI monarch has cleared the SMI_In_Prog flag. The main advantage is that processors executing application-level code in the privilege level 3 continue to do useful work even when the SMI is being handled by another processor or other processors.

In addition, the SMI handling may be enhanced by the use of vectors associated with the SMIs. The vectored SMIs carry interrupt information such as the source of the interrupt, the nature of the interrupt, the task that needs to be performed, the requested resources, the location of the interrupt handler, the device identifier, etc. The use of vectors provides several advantages compared to non-vectored SMI. First, the SMI response is faster. The overheads associated with polling multiple status registers in the system are significantly reduced. Second, the corresponding event handler may be invoked directly because the uniquely assigned vectors are passed along with the SMI signal or message, resulting in high efficiency. Third, multiprocessing may be enhanced. The assignments of vectors to different processors and/or events in the system allow concurrent handling of SMIs in a system. This is much more efficient than using single processor to run all the SMI handling code sequentially.

FIG. 1A is a diagram illustrating a link-based system 100 in which one embodiment of the invention can be practiced. The system 100 may include a plurality of processor units $110_1$ to $110_N$, a plurality of integrated memory controllers (IMCs) $120_1$ to $120_P$, a plurality of memories $130_1$ to $130_P$, an input/output controller (IOC) 140, an interconnect 145, a mass storage interface 150, and input/output (I/O) devices $160_1$ to $160_K$.

The processor units $110_1$ to $110_N$ are interconnected by links. Each of the processor units $110_1$ to $110_N$ represents a physical processor, a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. Alternatively, one or more of the processor units $110_1$ to $110_N$ may be a logical processor. A logical processor may be an independent processor visible to the operating system (OS). Typically, a logical processor may execute code and maintain a unique architectural state from other processors in the system. For example, the Hyper-Threading (HT) technology allows multiple threads executing in parallel using a single physical processor.

Each of the integrated memory controllers (IMCs) $120_1$ to $120_P$ provides control and configuration of memory and input/output devices such as the main memory $130_1$ to $130_P$ and the IOC 140. Each of the IMCs $120_1$ to $120_P$ may be integrated into a chipset that integrates multiple functionalities such as graphics, media, isolated execution mode, host-to-peripheral bus interface, memory control, power management, etc. Each of the IMCs $120_1$ to $120_P$ or its memory controller functionality may be integrated in each of the processor units $110_1$ to $110_N$. In some embodiments, the memory controller, either internal or external to the processor unit $110_i$ (i=1, . . . , N), may work for all cores or processors in the processor unit $110_i$. In other embodiments, it may include different portions that may work separately for different cores or processors in the processor unit $110_i$. The IMCs $120_1$ to $120_P$ may be interfaced to the IOC 140 via point-to-point links or a multi-drop bus.

The IMCs $120_1$ to $120_P$ and the processor units $110_1$ to $110_N$ are typically interconnected using a multi-processing interconnect scheme. The interconnect scheme may support multiprocessing operations in any suitable manner. It may be a common system interconnect (CSI) or a bus-based interconnect.

Each of the memories $130_1$ to $130_P$ stores code and data accessible to the corresponding processor unit. They are typically implemented with dynamic random access memory (DRAM), static random access memory (SRAM), or any other types of memories including those that do not need to be refreshed. In particular, each of the memories $130_1$ to $130_P$ may include a SMI handler 135 to handle SMI events. Alternatively, all the SMM code may be in a memory associated with one of the IMCs $120_1$ to $120_P$. It is noted that the number of memories may not be the same as the number of IMCs $120_1$ to $120_P$. In some embodiments, there may be a single system memory that is accessible to all the processor units $110_1$ to $110_N$.

The IOC 140 has a number of functionalities that are designed to support I/O functions. The IOC 140 may also be integrated into a chipset together or separate from each of the IMCs $120_1$ to $120_P$ to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc. In particular, the IOC 140 may have a Direct Media Interface (DMI) to the associated IMC $120_i$ (i=1, . . . , P).

The interconnect 145 provides interface to peripheral devices. The interconnect 145 may be point-to-point or connected to multiple devices. For clarity, not all the interconnects are shown. It is contemplated that the interconnect 145 may include any interconnect or bus such as Peripheral Component Interconnect (PCI), PCI Express, USB, etc.

The mass storage interface 150 provides an interface to a mass storage device that stores archive information such as code, programs, files, data, and applications. The mass storage device may include a compact disk (CD) read-only memory (ROM) 152, a digital video/versatile disc (DVD) 154, a floppy drive 156, and a hard drive 158, and any other magnetic or optic storage devices. The mass storage interface 150 provides a mechanism to read machine-accessible media. The I/O devices $160_1$ to $160_K$ may include any I/O devices to perform I/O functions. Examples of I/O devices $160_1$ to $160_K$ include controller for input devices (e.g., keyboard, mouse, trackball, pointing device), media card (e.g., audio, video, graphic), network card, and any other peripheral controllers.

Figure 1B:
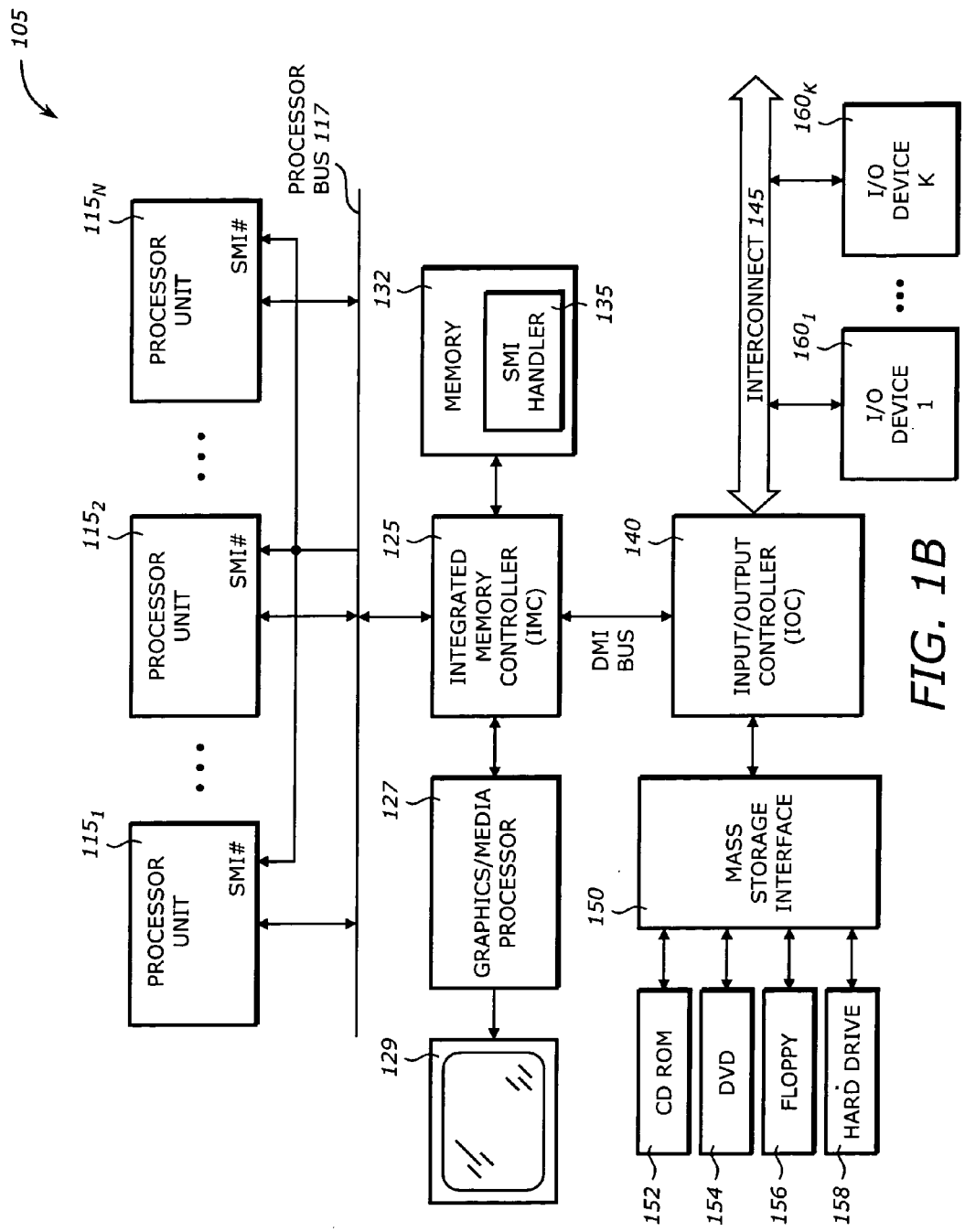
FIG. 1B is a diagram illustrating a bus-based system in which one embodiment of the invention may be practiced.

FIG. 1B is a diagram illustrating a bus-based system 105 in which one embodiment of the invention may be practiced. The system 105 may include a plurality of processor units $115_1$ to $115_N$, an integrated memory controller (IMC) 125, a graphics/media processor 127, a display monitor 129, a memory 132, an input/output controller (IOC) 140, an interconnect 145, a mass storage interface 150, and input/output (I/O) devices $160_1$ to $160_K$.

The processor units $115_1$ to $115_N$ are interconnected by a common bus 117. More than one bus may be employed. Each of the processor units $115_1$ to $115_N$ may have a SMI pin at the FSB. The SMI pins of the processor units $115_1$ to $115_N$ may be shared or tied together to provide a common SMI signal. Each of the processor units $115_1$ to $115_N$ may be similar to any one of the processor units $110_1$ to $110_N$ shown in FIG. 1A.

The graphics/media processor 127 is any processor that provides graphics or media functionalities. The graphics processor 127 may also be integrated into the IMC 125 to form a Graphics and Memory Controller (GMC). The graphics/media processor 127 may be a graphics card such as the Graphics Performance Accelerator card, interfaced to the IMC 125 via a graphics port such as the Accelerated Graphics Port (AGP) controller. The graphics/media processor 127 provides interface to the display monitor 129 such as standard progressive scan monitor, television (TV)-out device, and Transition Minimized Differential Signaling (TMDS) controller. The display monitor 129 may be any display device such as Cathode Ray Tube (CRT) monitor, TV set, Liquid Crystal Display (LCD), Flat Panel, and Digital CRT.

The IMC 125 may be similar to any one of the IMCs $120_1$ to $120_P$ shown in FIG 1A. The memory 132 may contain an SMI handler 135 accessible to any one of the processor units $115_1$ to $_N$. The input/output controller (IOC) 140, the interconnect 145, the mass storage interface 150, and the input/output (I/O) devices $160_1$ to $160_K$ are similar to those shown in FIG. 1A.

Figure 2:
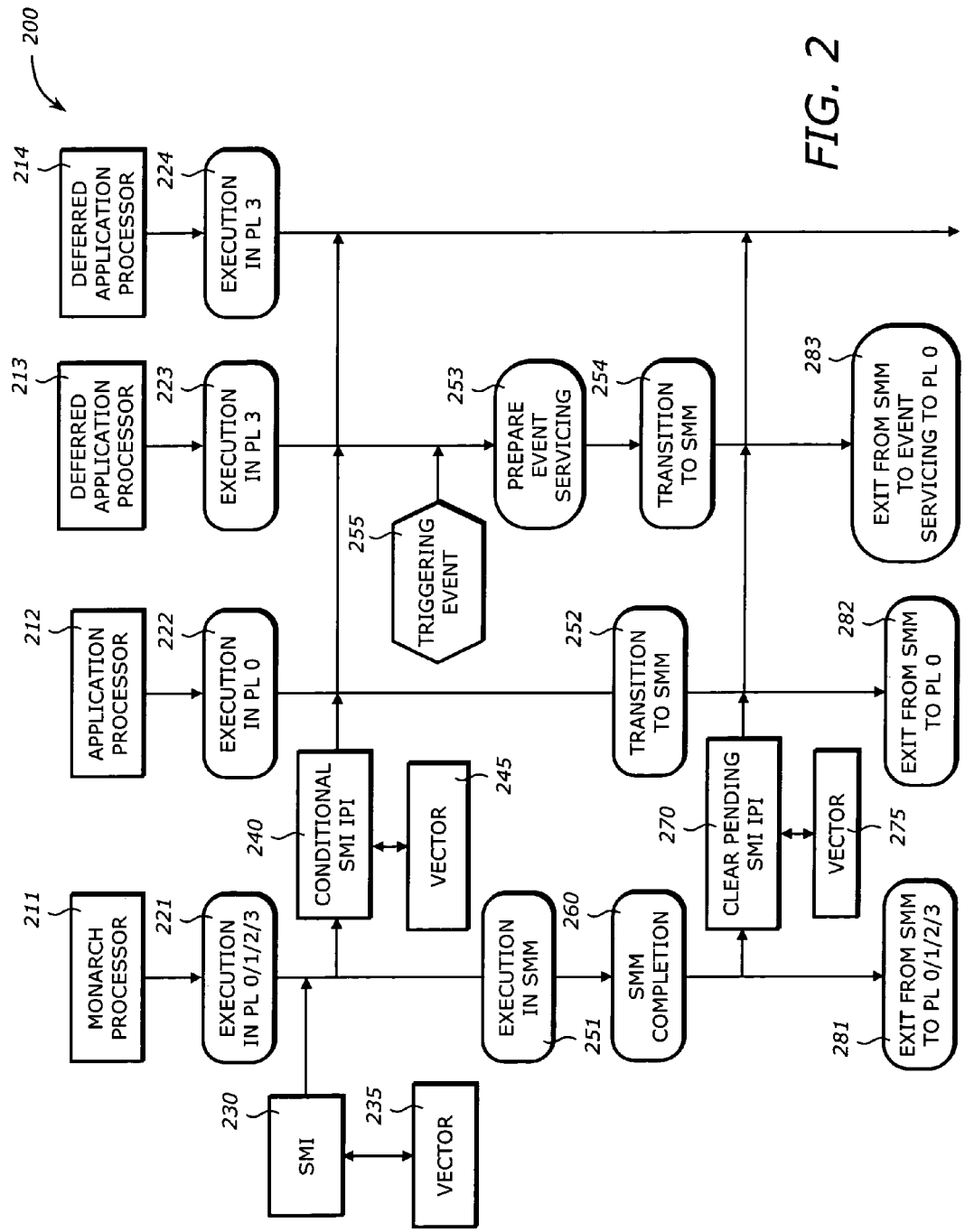
FIG. 2 is a diagram illustrating a system management interrupt (SMI) handling according to one embodiment of the invention.

FIG. 2 is a diagram illustrating a multiprocessor system 200 handling an SMI according to one embodiment of the invention. The multiprocessor system 200 includes 4 processors 211, 212, 213, and 214. Each of the processors may be a physical processor or a logical processor. For illustrative purposes, FIG. 2 shows 4 processors. It is contemplated that any number of processors may be used.

The processor 211 is an SMI monarch. The SMI monarch is a processor that assumes the responsibility of managing the SMI handling for the system. It may be a pre-designated processor, or a processor that is selected according to some pre-defined criteria such as performance, responsiveness, etc. In one embodiment, the SMI monarch may be the processor responsible for handling a particular platform event (e.g., different monarch processors assigned for different events). This is a directed SMI to a single processor. Typically, the SMI monarch is a processor that is executing in all privilege levels as seen by the OS. In one embodiment, the OS uses 4 privilege levels (PLs) from 0 through 3. The privilege level 0 (PL0) corresponds to the kernel mode. The privilege levels 1 (PL1) and 2 (PL2) are for OS services. The privilege level 3 (PL3) is for applications run by users. The SMI monarch processor 211 is capable of executing all PLs PL0/1/2/3.

The processors 212, 213 and 214 are other processors in the system. In principle, all processors may execute in all privilege levels. However, depending on a particular configuration at a particular instant, a processor may obtain a status according to what privilege level it is executing in. In the context of SMI handling, two statuses or modes may be obtained by a non-monarch processor: an Application Processor (AP) status and a deferred AP status. In one embodiment, the AP status is a status in which the processor is executing in PL 0, 1, or 2, and the deferred AP status is one in which the processor is executing in PL 3. When a processor obtains the AP status, it can recognize a conditional SMI IPI message immediately. The processor 212 is executing in PL0, PL1, and PL3; therefore, it is an AP. The processors 213 and 214 are executing in PL3 only; therefore, they are deferred APs. The processor 213 is a deferred AP that may attempt to switch to a higher privilege level during an SMI event. The processor 214 is a deferred AP that does not switch to a higher PL during the SMI event.

The processors 211, 212, 213, and 214 are initially in states 221, 222, 223, and 224, respectively. The state 221 is the state where the processor 211 is executing in the PL0, PL1, PL2, or PL3. The state 222 is the state where the processor 212 is executing in the PL0. Note that this is for illustrative purposes only. The state 222 may correspond to PL1 or PL2. The states 223 and 224 are the states where the processors 213 and 214 are executing in PL3. As discussed above, the state 222 corresponds to the AP status or mode while the states 223 and 224 correspond to the deferred AP status or mode.

The processor 211 receives an SMI 230. The SMI 230 may be generated by a chipset such as the IOC 140 shown in FIG. 1. The SMI 230 may be asynchronous or synchronous. Typically, the asynchronous SMI generation uses a register in one of the IMC $120_1$ to $120_P$. This register may contain the interrupt destination address and a vector field associated with the interrupt. For synchronous SMI generation, the read and write I/O transactions (e.g., execution of input/output instructions) on the system interconnect (e.g., the CSI) may carry the requester processor identifier. This information may be included in a DMI bus message between the IOC 140 and the associated IMC (e.g., the IMC $120_1$ shown in FIG. 1). In one embodiment, the SMI, either asynchronous or synchronous, may be generated in the form of a message sent from the IOC 140 to the associated IMC on the DMI bus instead of a pin output of the IOC 140. The SMI 230 is associated with a system management mode (SMM). When a processor responds to an SMI, it typically transitions to, or enters, the SMM to service the request by executing a corresponding SMI handler.

The SMI 230 has an associated vector 235 that may contain a pointer to provide interrupt information such as the source of the interrupt, the nature of the interrupt, the task that needs to be performed, the requested resources, the location of the interrupt handler, the device identifier, etc. The use of vectors in SMI eliminates the need for the handler to go through a variety of checks on the status registers in the chipset to figure out what specific event(s) that trigger the SMI or to identify the appropriate handling of the SMI.

Upon receipt of the SMI 230 with the vector 235, the monarch processor 211 generates or broadcasts a conditional SMI inter-processor interrupt (IPI) message 240 with a vector 245 to the processors 212, 213, and 214. The conditional SMI IPI message 240 may be broadcast using any suitable communication protocol as established by the system interconnect. After broadcasting the conditional SMI IPI message 240, the processor 211 enters the SMM in an execution in SMM state 251. When the processor 211 is in the state 251, it does not require or wait for the other processors to check into the SMM. It proceeds to process the SMI. Then, the processor 211 enters an SMI completion state 260. In the SMI completion state 260, the processor 211 has determined that there are no other SMIs to be serviced. At the end of the SMI completion state 260, the processor 211 generates or broadcasts a clear pending SMI IPI message 270 with a vector 275 to the processors 212, 213, and 214. The clear pending SMI IPI message 270 serves to inform the receiving processors to clear any pending SMI condition. After broadcasting the clear pending SMI IPI message 270, the processor 211 enters an exit state 281 to exit from the SMM and return to the execution in the PL0, PL1, PL2, or PL3 as before the SMI event. During the SMM completion and exit processing, the monarch processor 211 may set a variable on which the other processors in SMM (e.g., the processors 212 and 213) are waiting. Note that the transmission of the directed SMI to the monarch processor, and the broadcasting of the conditional SMI IPI and clear pending SMI IPI messages may occur with or without the associated vectors 235, 245, and 275, respectively. In addition, these vectors may be the same or may be different. As discussed above, the use of vectors enhances the SMI processing by giving additional information regarding the interrupts so that the receiving processor may respond to the interrupt in a flexible and/or efficient manner.

The AP 212 receives the conditional SMI IPI message 240 from the monarch processor 211. It then enters a state 252.

The state 252 is the state where the processor 212 transitions to, or enters, the SMM state because it is at the PL0. Only processors in PL0, PL1, or PL2 (the APs) may enter the SMM upon receiving the conditional SMI IPI message 240 because these APs may have the potential to cause any resource conflicts while the monarch processor 211 is handling the SMI. Upon receipt of the clear pending SMI IPI message 270 from the monarch processor 211, the AP 212 enters an exit state 282 to exit from the SMM and return to the execution in the PL0 as before the SMI event.

The deferred AP 213 receives the conditional SMI IPI message 240 from the monarch processor 211, but it does not enter the SMM. Instead, it continues execution in the PL3. It may also latch a pending SMI condition in a register. This latch may be cleared as soon as the deferred AP 213 enters SMM. During the SMI event and while executing in the PL3, a triggering event 255 may occur to the deferred AP 213 that requires it to switch to a higher privilege level. Examples of the triggering event 255 may include a system call or an interrupt. In response to the triggering event 255, the deferred AP 213 enters a state 253 to prepare for servicing the event. Thereafter, the deferred AP 213 attempts to switch to PL0-2. This attempt causes recognition of a pending SMI condition. This is followed by a state 254 where the deferred AP 213 transitions to, or enter, the SMM. Upon receipt of the clear pending SMI IPI message 270 from the monarch processor 211, the deferred AP 213 enters an exit state 283 to exit from the SMM and return to the state 253 to service the event 255.

The deferred AP 214 receives the conditional SMI IPI message 240 from the monarch processor 211, but it does not enter the SMM. Instead, it continues execution in the PL3. It may also latch a pending SMI condition in a register. Since there is no triggering event that causes the deferred AP 214 to switch to a higher privilege level, it continues doing useful work in the PL3 while the SMI is being handled by other processor(s). Upon receipt of the clear pending SMI IPI message 270 from the monarch processor 211, the deferred AP 214 clears the pending SMI condition.

It is noted that the above scenario is for illustrative purposes. As indicated earlier, any number of processors may participate in SMI processing. A processor may obtain and/or change any status (e.g., AP, deferred AP) at any time. In addition, other than the monarch processor, all SMI-participating processors may be APs, deferred APs, or mixed in any combination (e.g., APs and deferred APs). Furthermore, if there are deferred APs, they may or may not switch to higher privilege level during SMI processing.

Conditional SMI provides many features. First, workloads such as video motion, high definition audio, etc. that primarily execute at PL3 have less SMM interruptions as exemplified by the deferred AP 214. Second, forcing fewer processors to transition to the SMM reduces processing overheads because entry and exit transitions are expensive in terms of number of clock cycles. Third, the number of processors that are required to save and restore their state is minimized, resulting in reduced memory bandwidth and SMI entry/exit latency. Fourth, since the monarch processor 211 does not have to wait for the other AP's to enter or exit from the SMM for rendezvous, the SMM processing is further expedited. Fifth, there is a scalability advantage. When the number of processors increases, many of these processors are execute in PL3 only and they may be left undisturbed by SMI processing. Sixth, the processors may remain in sleep state undisturbed by SMI, resulting in power savings. Seventh, there are no OS changes and only minimal changes to the existing SMI firmware. Eighth, the heavy overheads caused by cache invalidation occurring on SMI entries or exits may be significantly reduced due to less processors entering the SMM.

These advantages, coupled with the use of vectors, provide a significant performance enhancement compared to non-conditional or non-vectored SMI processing.

Figure 3A:
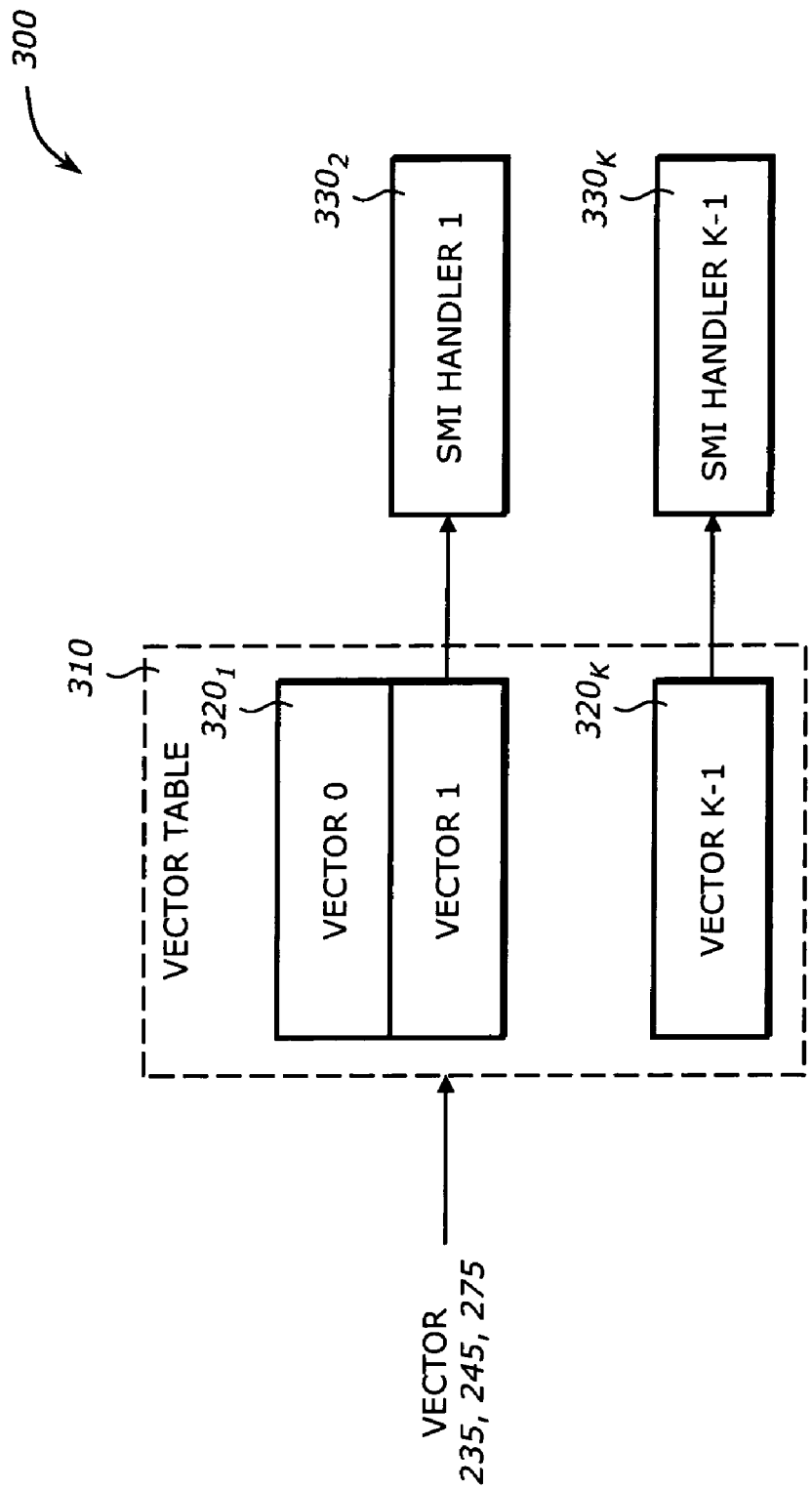
FIG. 3A is a diagram illustrating an SMI vectoring according to one embodiment of the invention.

FIG. 3A is a diagram illustrating an SMI vectoring 300 according to one embodiment of the invention. The SMI vectoring 300 includes a vector table 310 and K-1 SMI handlers $330_2$ to $330_K$.

The vector table 310 contains K entries $320_1$ to $320_K$ corresponding to the K SMI handlers $330_1$ to $330_K$, respectively. Each entry is a vector pointing to a corresponding SMI handler. The SMI handler is a program, a routine, a function, or a method to service the corresponding SMI event. The SMI handler may contain data structures that contain information related to the interrupt. The SMI vector 235, 245, or 275 is used as an index to look up the entries $320_1$ to $320_K$. In one embodiment, the entry 0 (vector 0) is used for broadcast message. Therefore, there is no SMI handler corresponding to the SMI vector number 0.

Figure 3B:
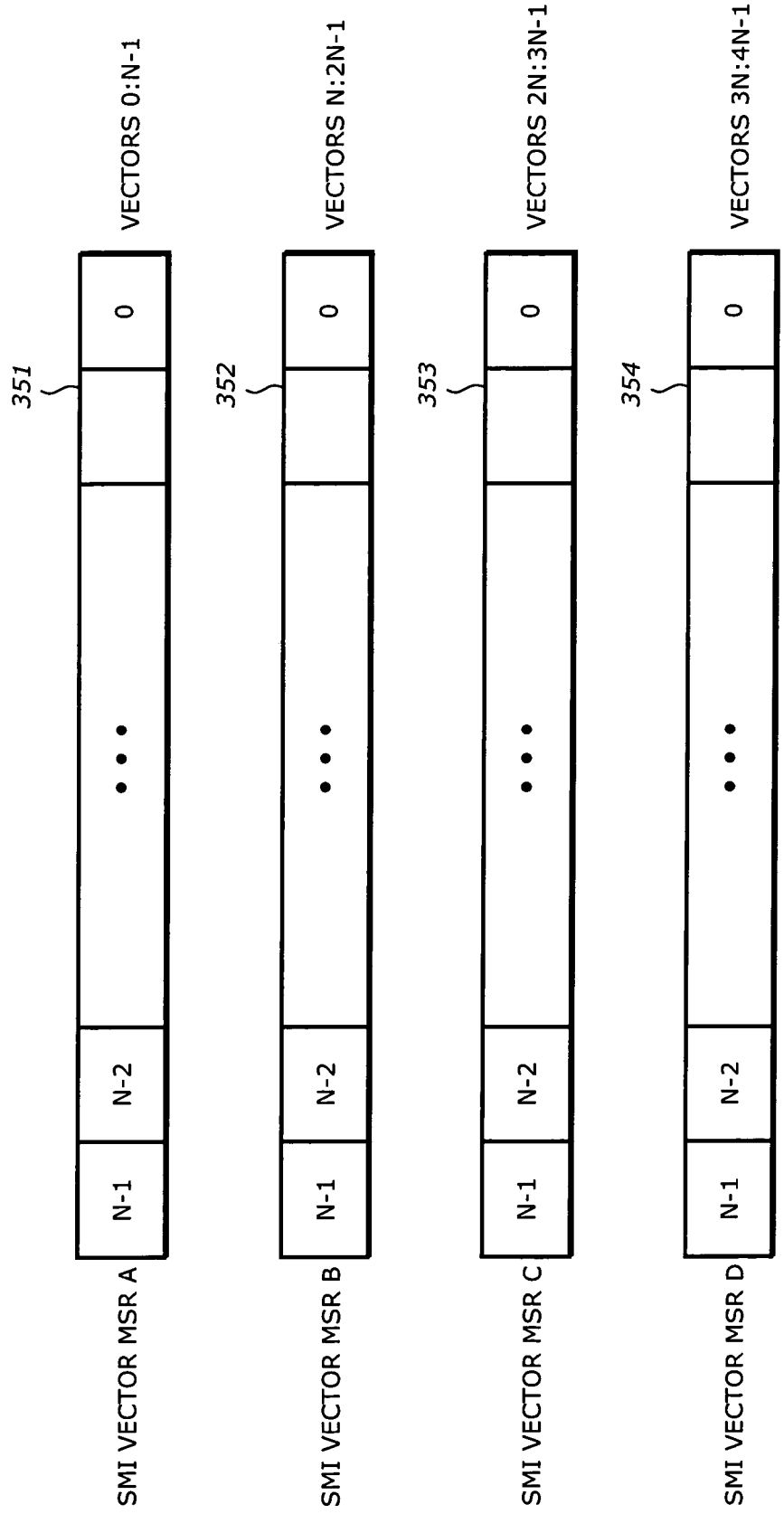
FIG. 3B is a diagram illustrating model specific registers for vector identifiers according to one embodiment of the invention.

FIG. 3B is a diagram illustrating model specific registers (MSRs) for vector identifiers according to one embodiment of the invention. The MSRs may include four MSRs 351, 352, 353, and 354.

When an SMI IPI message is transmitted, it may have a vector identifier to identify the SMI event corresponding to the SMI IPI message. This vector identifier may be obtained through the MSRs. The MSRs 351, 352, 353, and 354 are four architecturally defined registers MSR A, MSR B, MSR C, and MSR D that may be accessible by the SMM or a SMI Transfer Monitor (STM). The word length of these MSRs may be any desired length N. In one embodiment, the word length N of these registers is 64.

The bit position in each register indicates the vector identifier. For example, when a bit is asserted, its position identifies the vector number associated with the SMI IPI message. Each of the 4 MSRs 351, 352, 353, and 354 may correspond to a range of vector identifiers or vector numbers. The MSR A 351 covers the range of vectors from vector numbers 0 to N-1. The MSR B 352 covers the range of vectors from vector numbers N to 2N-1. The MSR C 353 covers the range of vectors from vector numbers 2N to 3N-1. The MSR D 354 covers the range of vectors from vector numbers 3N to 4N-1. For N=64, the four MSRs may accommodate a total of 256 different vectors. The use of 4 MSRs is for illustrative purposes only. Any number of MSRs may be used to accommodate any desired number of vectors.

Figure 4:
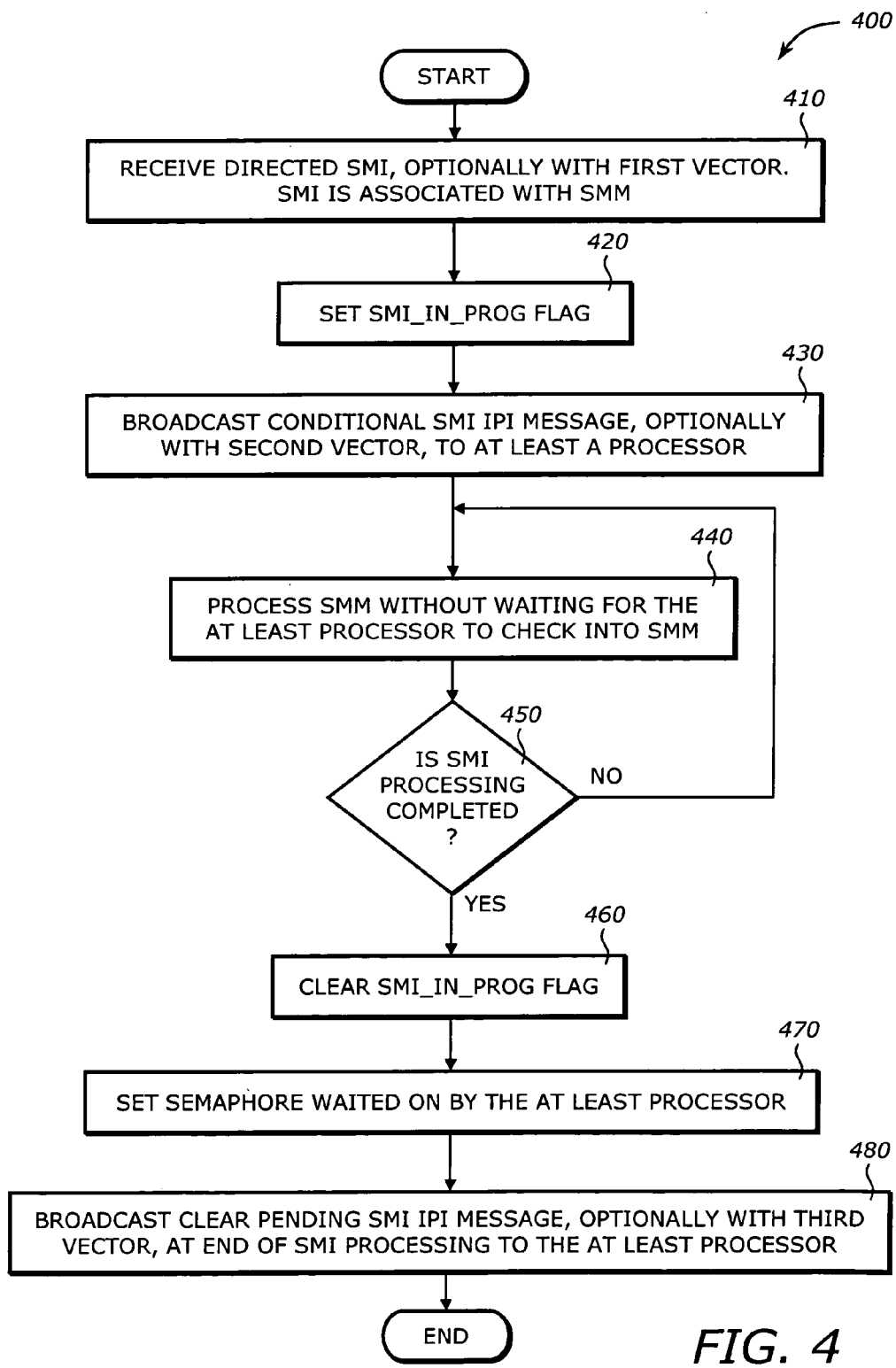
FIG. 4 is a flowchart illustrating a process by an SMI monarch to send messages to other processors according to one embodiment of the invention.

FIG. 4 is a flowchart illustrating a process 400 by an SMI monarch to send messages to other processors according to one embodiment of the invention. The process 400 is typically performed by the SMI monarch processor.

Upon START, the process 400 receives a directed system management interrupt (SMI), optionally with a first vector (Block 410). The directed SMI is associated with a system management mode (SMM). The directed SMI with the vector may be sent from a chipset. It may be asynchronous or synchronous. The vector points to a vector table and is associated with interrupt information. Then, the process 400 sets a SMI_In_Prog flag to indicate that the monarch processor is executing in SMM (Block 420).

Next, the process 400 broadcasts a conditional SMI interprocessor interrupt (IPI) message, optionally with a second vector, to at least a processor (Block 430). The receiving of the SMI and the broadcasting of the conditional SMI IPI message may be done via a common system interconnect or a bus-based interconnect. Then, the process 400 processes the SMI without waiting for the at least processor (e.g., the AP processor or processors) to check into the SMM (Block 440).

Then, the process 400 determines if SMI processing is completed (Block 450). If not, the process 400 returns to Block 440 to continue processing the SMI. Otherwise, the process 400 clears the SMI_In_Prog flag (Block 460). Next, the process 400 sets an exit semaphore or a variable waited on by the at least processor to indicate completion of SMI processing (Block 470). Then, the process 400 broadcasts a clear pending SMI message to the at least processor, optionally with a third vector, at end of SMI processing to clear a pending SMI condition (Block 480). The process 400 is then terminated.

Figure 5:
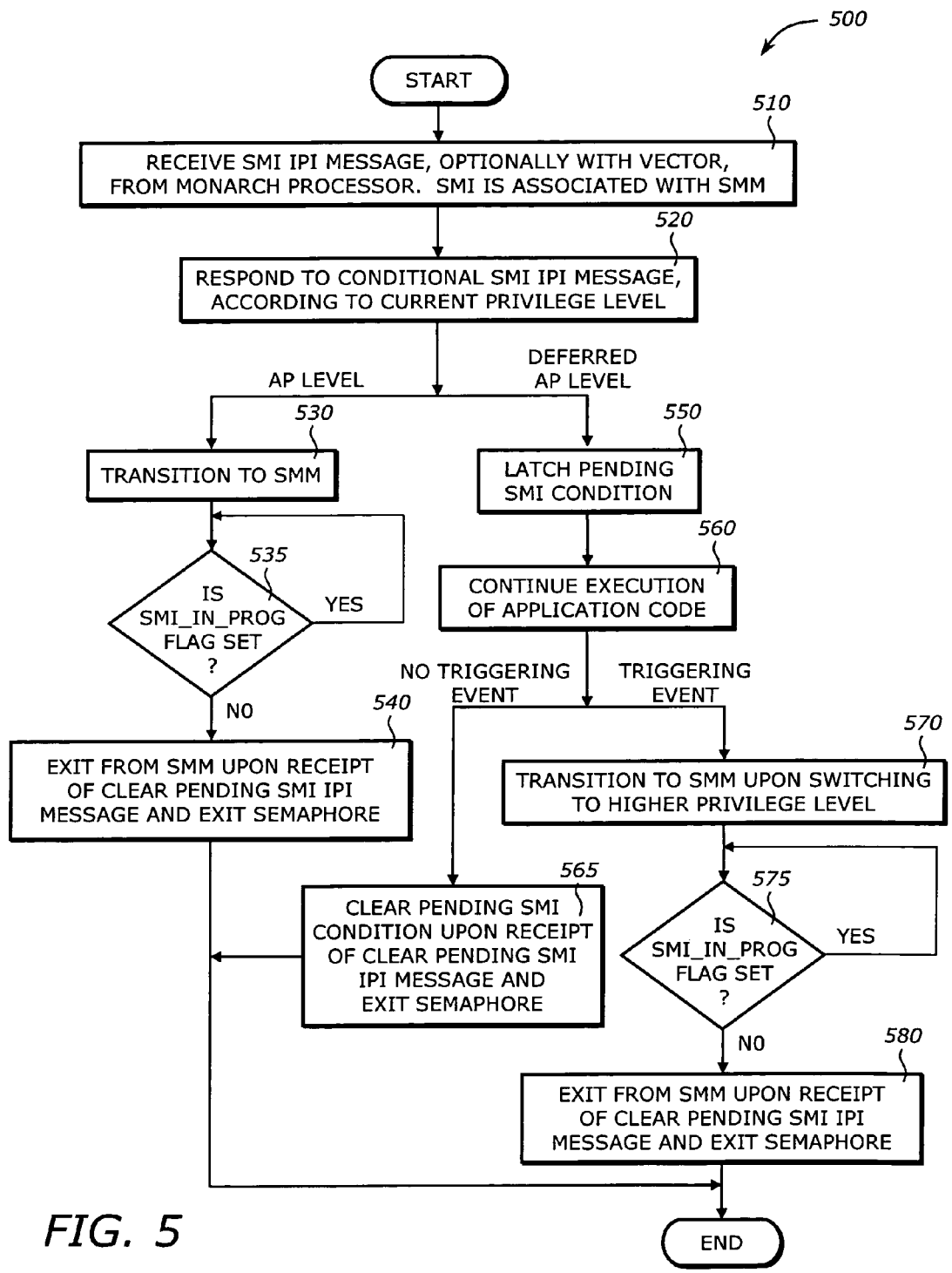
FIG. 5 is a flowchart illustrating a process to respond to the SMI monarch messages according to one embodiment of the invention.

FIG. 5 is a flowchart illustrating a process 500 to respond to the SMI monarch messages according to one embodiment of the invention. The process 500 is typically performed by processors in the system other than the SMI monarch. These processors may include the AP and the deferred AP processors.

Upon START, the process 500 receives a conditional system management interrupt (SMI) inter-processor interrupt (IPI) message, optionally with a vector, from a first processor (Block 510). The first processor is typically a monarch processor. The conditional SMI IPI message may be a directed message. The SMI is associated with a system management mode (SMM). The vector contains information regarding the interrupt source, nature, task to be performed, device identifier, or any other relevant information. Then, the process 500 responds to the conditional SMI IPI message according to a current privilege level (Block 520). The current privilege level is the privilege level that the processor is operating at.

If the current privilege level corresponds to an application programming (AP) level, the process 500 transitions to the SMM (Block 530). Then, the process 500 determines if a SMI_In_Prog flag is set (Block 535). If so, the process 500 stays in the SMM and returns to Block 535. Otherwise, the process 500 exits from the SMM upon receipt of a clear pending SMI message from the first processor and the setting of an exit semaphore indicating completion of SMI processing (Block 540). The process 500 is then terminated.

If the current privilege level corresponds to a deferred AP level, the process 500 latches a pending SMI condition (Block 550). Then, the process 500 continues execution of application code in the current privilege level (Block 560). During the execution of the application code, there may be a triggering event requiring switching to a higher privilege level. To respond to such a triggering event, the process 500 transitions to the SMM upon switching to the higher privilege level (Block 570). Then, the process 500 determines if an SMI_In_Prog flag is set (Block 575). If so, the process 500 remains in the SMM and returns to Block 575. Otherwise, the process 500 exits from the SMM upon receipt of the clear pending SMI message from the first processor and upon recognizing an exit semaphore set by the monarch processor (Block 580). Next, the process 500 returns to service the triggering event (Block 585) and is then terminated. If there is no triggering event, the process 500 clears the pending SMI condition upon receipt of the clear pending SMI message and upon recognizing an exit semaphore set by the monarch processor (Block 590). The process 500 is then terminated.

Figure 6:
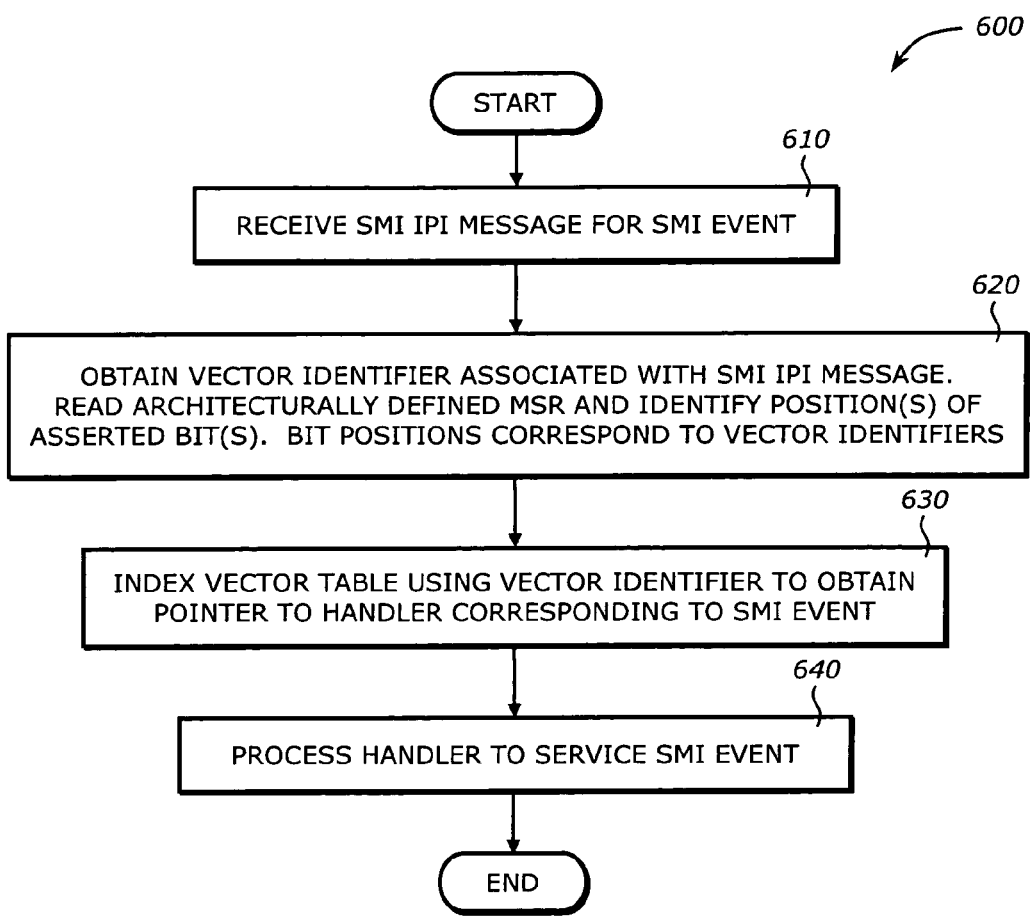
FIG. 6 is a flowchart illustrating a process to launch a handler using a vector identifier according to one embodiment of the invention.

FIG. 6 is a flowchart illustrating a process 600 to launch a handler using a vector identifier according to one embodiment of the invention.

Upon START, the process 600 receives an SMI IPI message for an SMI event (Block 610). Typically, the SMI IPI is broadcast by a monarch processor. Next, the process 600 obtains a vector identifier associated with the SMI IPI message (Block 620). The vector identifier is a number that uniquely identifies the particular SMI IPI that needs to be serviced or responded to. This may be obtained by reading an architecturally defined MSR as shown in FIG. 3B, and recognizing a logic value of a bit in the MSR. For example, a bit that is set indicates that its position corresponds to the vector number of the SMI event. In one embodiment, reading the MSR resets the register bits. This is to allow multiple sequential interrupts of the same vector number to be recognized.

Next, the process 600 indexes a vector table using the vector identifier to obtain a pointer to a handler corresponding to the SMI event (Block 630). Then, the process 600 processes the handler to service the SMI event (Block 640). The process 600 is then terminated.

The vectored SMI processing is independent of the conditional SMI processing. As indicated earlier, conditional SMI processing may take place with or without vectors. With vectors, the SMI processing may be more efficient and flexible. Similarly, vectored SMI processing may take place without conditional SMI.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving a system management interrupt (SMI), the SMI being associated with a system management mode (SMM);
   broadcasting a conditional SMI inter-processor interrupt (IPI) message to at least a processor;
   processing the SMI without waiting for the at least processor to check into the SMM; and
   broadcasting a clear pending SMI IPI message to the at least processor at end of SMI processing to clear a pending SMI condition.

2. The method of claim 1 wherein receiving the SMI comprises:
   receiving the SMI with a vector from a chipset, the vector pointing to a vector table and associated with interrupt information.

3. The method of claim 1 wherein receiving the SMI comprises:
   receiving the SMI via a common system interconnect or a bus-based interconnect.

4. The method of claim 1 wherein broadcasting the conditional SMI IPI message comprises:
   broadcasting the conditional SMI message with a vector associated with interrupt information.

5. The method of claim 1 wherein broadcasting the clear pending SMI IPI message comprises:
   broadcasting the clear pending SMI IPI message with a vector associated with interrupt information.

6. The method of claim 1 further comprising:
   setting an SMI-in-progress flag upon start of SMI processing.

7. The method of claim 6 further comprising:
   clearing the SMI-in-progress flag upon completion of SMI processing; and
   setting an exit semaphore upon completion of SMI processing.

8. A method comprising:
   receiving a conditional system management interrupt (SMI) inter-processor interrupt (IPI) message from a first processor responsive to a SMI, the SMI being associated with a system management mode (SMM); and
   responding to the conditional SMI IPI message according to a current privilege level being one of an application processor (AP) level and a deferred AP level.

9. The method of claim 8 wherein responding to the conditional SMI IPI message comprises:
   if the current privilege level corresponds to the AP level,
      transitioning to the SMM, and
      exiting from the SMM upon receipt of a clear pending SMI message from the first processor indicating completion of SMI processing; and
   if the current privilege level corresponds to the deferred AP level,
      latching a pending SMI condition, and
      continuing execution of application code in the current privilege level.

10. The method of claim 9 wherein exiting from the SMM if the current privilege level corresponds to an AP level comprises:
    exiting from the SMM upon recognizing an exit semaphore set by the first processor.

11. The method of claim 9 wherein responding to the conditional SMI IPI message if the current privilege level corresponds to a deferred AP level further comprises:
    clearing the pending SMI condition upon receipt of the clear pending SMI message.

12. The method of claim 9 wherein continuing execution of the application code comprises:
    transitioning to the SMM upon switching to a higher privilege level in response to a triggering event;
    exiting from the SMM upon receipt of the clear pending SMI message from the first processor; and
    returning to service the triggering event.

13. The method of claim 12 wherein exiting from the SMM comprises:
    exiting from the SMM upon recognizing an exit semaphore set by the first processor.

14. An article of manufacture comprising:
    a machine-accessible storage medium including data that, when accessed by a machine, cause the machine to perform operations comprising:
    receiving a system management interrupt (SMI), the SMI being associated with a system management mode (SMM);
    broadcasting a conditional SMI inter-processor interrupt (IPI) message to at least a processor;

processing the SMI without waiting for the at least processor to check into the SMM; and broadcasting a clear pending SMI IPI message to the at least processor at end of SMI processing to clear a pending SMI condition.

15. The article of manufacture of claim 14 wherein the data causing the machine to perform receiving the SMI comprise data that, when accessed by a machine, cause the machine to perform operations comprising:

receiving the SMI with a vector from a chipset, the vector pointing to a vector table and associated with interrupt information.

16. The article of manufacture of claim 14 wherein the data causing the machine to perform receiving the SMI comprise data that, when accessed by a machine, cause the machine to perform operations comprising:

receiving the SMI via a common system interconnect or a bus-based interconnect.

17. An article of manufacture comprising:

a machine-accessible storage medium including data that, when accessed by a machine, cause the machine to perform operations comprising:

receiving a conditional system management interrupt (SMI) inter-processor interrupt (IPI) message from a first processor responsive to a SMI, the SMI being associated with a system management mode (SMM); and responding to the conditional SMI IPI message according to a current privilege level being one of an application processor (AP) level and a deferred AP level.

18. The article of manufacture of claim 17 wherein the data causing the machine to perform responding to the conditional SMI IPI message comprise data that, when accessed by the machine, cause the machine to perform operations comprising:

if the current privilege level corresponds to the AP level, transitioning to the SMM, and exiting from the SMM upon receipt of a clear pending SMI message from the first processor indicating completion of SMI processing; and if the current privilege level corresponds to the deferred AP level, latching a pending SMI condition, and continuing execution of application code in the current privilege level.

19. The article of manufacture of claim 18 wherein the data causing the machine to perform responding to the conditional SMI IPI message if the current privilege level corresponds to the deferred AP level further comprise data that, when accessed by the machine, cause the machine to perform operations comprising:

clearing the pending SMI condition upon receipt of the clear pending SMI message.

20. The article of manufacture of claim 18 wherein the data causing the machine to perform continuing execution of the application code comprise data that, when accessed by the machine, cause the machine to perform operations comprising:

transitioning to the SMM upon switching to a higher privilege level in response to a triggering event;

exiting from the SMM upon receipt of the clear pending SMI message from the first processor; and returning to service the triggering event.

21. A method comprising:

receiving a system management interrupt (SMI inter-processor interrupt (IPI) message for an SMI event;

obtaining a vector identifier associated with the SMI IPI message;

indexing a vector table using the vector identifier to obtain a pointer to a handler corresponding to the SMI event; and processing the handler to service the SMI event;

wherein obtaining comprises:

reading a model specific register (MSR); and identifying a logic value of a bit in the MSR at a bit position, the bit position corresponding to the vector identifier.

22. The method of claim 21 wherein reading the MSR comprises:

reading the MSR being one of a plurality of architecturally defined MSRs, each of the architecturally defined MSRs corresponding to a range of values of the vector identifier.

23. The method of claim 21 wherein reading the MSR comprises:

resetting MSR bits.

24. An article of manufacture comprising:

a machine-accessible storage medium including data that, when accessed by a machine, cause the machine to perform operations comprising:

receiving a system management interrupt (SMI) inter-processor interrupt (IPI) message for an SMI event;

obtaining a vector identifier associated with the SMI IPI message;

indexing a vector table using the vector identifier to obtain a pointer to a handler corresponding to the SMI event; and processing the handler to service the SMI event;

wherein the data causing the machine to perform obtaining comprise data that, when accessed by the machine, cause the machine to perform operations comprising:

reading a model specific register (MSR); and identifying a logic value of a bit in the MSR at a bit position, the bit position corresponding to the vector identifier.

25. The article of manufacture of claim 24 wherein the data causing the machine to perform reading comprise data that, when accessed by the machine, cause the machine to perform operations comprising:

reading the MSR being one of a plurality of architecturally defined MSRs, each of the architecturally defined MSRs corresponding to a range of values of the vector identifier.

26. The article of manufacture of claim 24 wherein the data causing the machine to perform reading comprise data that, when accessed by the machine, cause the machine to perform operations comprising:

resetting MSR bits.

27. A system comprising:

a chipset generating a system management interrupt (SMI), the SMI being associated with a system management mode (SMM);

a first processor coupled to the chipset and a second processor, the first processor operating at a first privilege level having a first memory containing a first system management interrupt (SMI) handler, the first SMI handler comprising:

a first broadcaster to broadcast a conditional SMI inter-processor interrupt (IPI) message upon receipt of a directed SMI, an SMI processing module to process the SMI, and
a second broadcaster to broadcast a clear pending SMI IPI message to the second processor at end of SMI processing to clear a pending SMI condition;
the second processor coupled to the first processor, the second processor operating at a second privilege level and having a second memory containing a second SMI handler, the second SMI handler comprising:
a receiver to receive the SMI IPI message from the first processor, and
a responder to respond to the conditional SMI IPI message according to the second privilege level.

28. The system of claim 27 wherein the SMI is associated with a vector, the vector pointing to a vector table and being associated with interrupt information.

29. The system of claim 27 wherein the responder causes transition to the SMM and exit from the SMM upon receipt of the clear pending SMI message if the second privilege level corresponds to an application processor (AP) level.

30. The system of claim 27 wherein the second processor latches a pending SMI condition in a register, and continues execution of application code in the second privilege level.

* * * * *